United States Patent Office 2,806,045
Patented Sept. 10, 1957

2,806,045

PRODUCTION OF PER-FATTY ACIDS

Albert Gross, Rhinefelden, Germany, assignor to Deutsche Gold- und Silber-Scheideanstalt vormals Roessler, Frankfurt am Main, Germany No Drawing. Application December 19, 1956,
Serial No. 629,216

Claims priority, application Germany December 23, 1955

7 Claims. (Cl. 260—406)

The present invention relates to an improved process for the production of per-fatty acids.

It is known that lower fatty acids, such as, for example, acetic acid, can be converted to per-fatty acids by reaction with aqueous hydrogen peroxide. It is also known that higher per-fatty acids can be prepared by reacting the fatty acids dissolved in concentrated sulfuric acid with 50% hydrogen peroxide. Furthermore, it has been proposed to produce per-lauric acid with the aid of 90% hydrogen peroxide employing tolyl sulfonic acid as a catalyst.

Aside from the fact that special care is required in working up the per acid produced in concentrated sulfuric acid because of the heating which occurs upon dilution, it is difficult when working with concentrated sulfuric acid and cconcentrated aqueous hydrogen peroxide in the presence of organic materials, to avoid the danger of explosive decomposition as soon as the reaction temperature rises.

The production of per-lauric acid by reacting an equimolecular quantity of 90% hydrogen peroxide with melted lauric acid in the presence of catalytic amounts of tolyl sulfonic acid only leads to a 43% conversion and the excess $H_2O_2$ is lost in the recovery of the per-lauric acid.

According to the invention it was found that per-fatty acids could be obtained in good yield, high concentration and excellent purity by reacting fatty acids or substituted fatty acids which are insoluble or difficultly soluble in water or aqueous salt solutions with a concentrated aqueous solution of hydrogen peroxide in the presence of boron trifluoride or boron trifluoride monohydrate. It was found that boron trifluoride or its monohydrate is especially suited as a catalyst for this process. On the other hand, only unsatisfactory results are obtained when using concentrated sulfuric acid, phosphoric acid, phosphoric acid anhydride, perchloric acid or benzene sulfonic acid as a catalyst.

It was found expedient to employ such quantities of fatty acid and hydrogen peroxide that at least 1 mol of hydrogen peroxide, preferably, more than 1.2 mol, are provided for every mol of fatty acid. It is also of advantage to use the hydrogen peroxide in the form of a concentrated aqueous solution, preferably one having at least a 90% concentration.

Further investigations have also shown that the best yields are obtained when the boron trifluoride or its monohydrate is employed in quantities providing at least 0.5 mol boron trifluoride or its monohydrate per mol of fatty acid. The best yields are obtained when 0.6 to 1.2 mol of boron trifluoride or its monohydrate is used. Larger quantities cause a reduction in yield.

The process according to the invention is expediently carried out by reacting the fatty acid in melted state with the boron trifluoride and hydrogen peroxide solution. It is advantageous to provide for a thorough intermixing of the reactants, for example, by shaking or stirring.

When water free boron trifluoride is employed, considerable heat of hydration can occur under some circumstances. Therefore, it can be of advantage when large quantities are to be reacted to employ the boron trifluoride monohydrate instead of the water free boron trifluoride.

The process according to the invention renders it possible to convert fatty acids into the per-fatty acids with good yields. The per-fatty acids are recovered from the reaction mixtures as concentrated solutions in the starting fatty acid employed. After completion of the reaction, the catalyst can be washed out of the reaction mixture with water or aqueous salt solutions in which the fatty acid and per-fatty acid are insoluble or difficultly soluble, if desired, with the addition of an inert organic solvent. It is of especial advantage that, when fatty acids containing more than 4 carbon atoms are employed, a second phase usually separates out of the reaction mixture which practically only contains substantially all of the boron trifluoride as the dihydrate in addition to a little water and hydrogen peroxide. All or a part of this separated phase can be worked up for recovery of the boron trifluoride.

The best yields are obtained when the fatty acid is reacted in concentrated form with the hydrogen peroxide and the boron trifluoride or its monohydrate. It is nevertheless possible to carry out the reaction in an inert organic solvent, such as chloroform, diethyl ether, petroleum ether or cyclohexane.

The process according to the invention is not limited to the treatment of straight chained fatty acids but is also applicable to branch chained or substituted fatty acids and the method of recovery can easily be adapted to the character of the fatty acid used.

The following examples will serve to illustrate the process according to the invention.

Example 1

A mixture of 2 parts by weight of lauric acid and 0.5 part by weight of boron trifluoride was reacted at 50° C. with 0.41 part by weight of 90% hydrogen peroxide. The heat of reaction was removed by stirring and external cooling. After the exothermic reaction subsided, the mixture was stirred for a further 45 minutes at 50° C. The upper organic phase was separated from the precipitated boron trifluoride dihydrate, which also contained water and excess $H_2O_2$, and poured with stirring into cold water.

The product was remelted twice in water with stirring whereupon a mineral acid free product was obtained containing 93.6% of per-lauric acid.

Example 2

2 parts by weight of lauric acid were reacted with stirring at 50° C. with 0.86 part by weight of boron trifluoride monohydrate and 0.41 part by weight of 90% hydrogen peroxide. After 45 minutes, the stirrer was turned off and the watery layer separated from the organic layer. The crude peracid was purified by washing with water while comminuting and remelting under water at the lowest temperature possible. The end product contained 88% of per-lauric acid.

Per-stearic acid, per palmitic acid, ethyl-n-butyl-peracetic acid, per-capric acid, per-caproic acid and per-butyric acid were prepared in an analogous manner.

Example 3

14.2 parts by weight of stearic acid were reacted with 1.8 parts by weight of boron trifluoride and 2.05 parts by weight of 90% hydrogen peroxide in a manner analogous to Example 1. 14.3 parts by weight of a product containing 71% of pre-stearic acid were obtained.

Example 4

A mixture of 58.7 parts by weight of caproic acid, 30.1 parts by weight of $BF_3.H_2O$ and 20.5 parts by weight of 90% $H_2O_2$ was reacted in the manner described in Example 2. The resulting organic phase was separated off and washed with a saturated aqueous sodium sulfate solution until it was mineral acid free and then dried with anhydrous sodium sulfate. 62 parts by weight of 73% per-caproic acid were obtained.

*Example 5*

A mixture of 26.43 parts by weight of butyric acid, 20.6 parts by weight of $BF_3.H_2O$ and 12.24 parts by weight of 97% $H_2O_2$ was reacted in the manner described in Example 2. After addition of a saturated aqueous ammonium sulfate solution an organic phase separated out which was taken up in 25 parts by weight of ether. The ether layer was washed mineral acid free with fresh aqueous saturated ammonium sulfate solution and then dried. The ether was then distilled off at 35° C. and 28.4 parts by weight of 70% per-butyric acid were obtained.

*Example 6*

A mixture of 9.4 parts by weight of monochloracetic acid, 6.9 parts by weight of $BF_3.H_2O$ and 4.1 parts by weight of 97% $H_2O_2$ was reacted in the manner described in Example 2. The reaction mixture was diluted with ether. The separated ether layer was washed mineral acid free with saturated aqueous ammonium sulfate and dried with anhydrous sodium sulfate. Thereafter the ether was distilled off at room temperature under vacuum. 8.1 parts by weight of 47% per-monochloracetic acid were obtained.

I claim:

1. A process for the production of per-fatty acids which comprises reacting a fatty acid which is at least difficultly soluble in aqueous salt solutions with a concentrated aqueous hydrogen peroxide solution in the presence of a fluoride selected from the group consisting of boron trifluoride and boron trifluoride monohydrate.

2. The process of claim 1 in which at least 1 mol of hydrogen peroxide is reacted per mol of fatty acid.

3. The process of claim 1 in which at least 1.2 mol of hydrogen peroxide is reacted per mol of fatty acid.

4. The process of claim 1 in which the aqueous hydrogen peroxide is of at least a 90% concentration.

5. The process of claim 1 in which at least 0.5 mol of fluoride per mol of fatty acid is employed.

6. The process of claim 1 in which 0.6 to 1.2 mol of fluoride are employed.

7. The process of claim 1 in which the fatty acid is reacted in the liquid state.

No references cited.